United States Patent [19]

Pohoreski

[11] Patent Number: 4,882,069
[45] Date of Patent: Nov. 21, 1989

[54] METHOD FOR THE TREATMENT OF SEWAGE AND OTHER IMPURE WATER

[75] Inventor: Anton P. Pohoreski, Saskatoon, Canada

[73] Assignee: Continental Manufacturing & Sales Inc., Saskatchewan, Canada

[21] Appl. No.: 228,872

[22] Filed: Aug. 5, 1988

Related U.S. Application Data

[60] Continuation of Ser. No. 892,831, Aug. 4, 1986, abandoned, which is a continuation-in-part of Ser. No. 753,550, Jul. 10, 1985, Pat. No. 4,724,085, which is a division of Ser. No. 621,236, Jun. 15, 1984, Pat. No. 4,576,714.

[51] Int. Cl.$^4$ .................................. C02F 1/56
[52] U.S. Cl. ...................... 210/713; 210/727; 210/728; 210/734
[58] Field of Search ............... 210/727, 713, 715, 728, 210/733, 734, 738

[56] References Cited

U.S. PATENT DOCUMENTS

| | | | |
|---|---|---|---|
| 2,218,053 | 10/1940 | Schwabe et al. | 210/702 |
| 2,858,269 | 10/1958 | Harwood et al. | 210/702 |
| 3,087,890 | 4/1963 | Pye | 210/712 |
| 3,097,163 | 7/1963 | Riddick | 210/714 |
| 3,170,814 | 2/1965 | Stroia et al. | 210/735 X |
| 3,171,804 | 2/1965 | Rice | 210/724 |
| 3,259,569 | 7/1966 | Priesing et al. | 210/713 |
| 3,259,570 | 7/1966 | Priesing et al. | 210/727 |
| 3,338,827 | 8/1967 | Mausolf | 210/713 |
| 3,349,030 | 10/1967 | Savage | 210/713 |
| 3,377,274 | 4/1968 | Burke et al. | 210/727 |
| 3,408,293 | 10/1968 | Dajani et al. | 210/727 |
| 3,453,207 | 7/1969 | Eck et al. | 210/728 |
| 3,456,796 | 7/1969 | Eck et al. | 210/728 |
| 3,463,726 | 8/1969 | Schulte | 210/712 |
| 3,479,283 | 11/1969 | Harrison et al. | 210/734 |
| 3,480,541 | 11/1969 | Lees | 210/734 |
| 3,596,570 | 8/1971 | Wukasch | 92/168 |
| 3,607,738 | 9/1971 | Nelson et al. | 210/728 |
| 3,617,568 | 11/1971 | Ries, Jr. | 210/727 |
| 3,723,310 | 3/1973 | Lang et al. | 210/727 |
| 4,049,545 | 9/1977 | Horvath | 210/665 |
| 4,089,831 | 5/1978 | Chambers | 210/732 X |
| 4,309,291 | 1/1982 | Probstein et al. | 210/713 |
| 4,385,903 | 5/1983 | Moriyama et al. | 210/732 X |
| 4,388,195 | 6/1983 | von Hagel et al. | 210/727 X |
| 4,425,238 | 1/1984 | Degen et al. | 210/666 |
| 4,479,879 | 10/1984 | Hashimoto et al. | 210/727 |
| 4,537,685 | 8/1985 | Kennedy et al. | 210/709 |
| 4,569,768 | 2/1986 | McKinley | 210/727 |

Primary Examiner—Tom Wyse
Attorney, Agent, or Firm—Birch, Stewart, Kolasch & Birch

[57] ABSTRACT

A method is provided herein for the treatment of sewage or other impure water. The method includes adding, to the sewage or other impure water in a mixing zone, all three individually but no more than two premixed together of the following: (a) an inorganic coagulant, (b) an anionic polymer, and (c) a cationic polymer, with intimate mixing of the added chemicals with the sewage or other impure water, with the proviso that (d) the inorganic coagulant, either alone or with the anionic polymer or the cationic polymer, cannot be added last; and (e) the anionic polymer and the cationic polymer cannot be intimately mixed and added together. This provides chemically-treated effluent having large, compact, firmly bonded, substantially-shear resistant and rapidly-separatable flocs therein. The flocs are separated from the liquid in a separating zone. Finally treated effluent effluent is removed from the separating zone.

31 Claims, No Drawings

METHOD FOR THE TREATMENT OF SEWAGE AND OTHER IMPURE WATER

CROSS-REFERENCE TO RELATED APPLICATIONS

This application is a continuation of application Ser. No. 892,831 filed 8/4/86, which was a continuation in part of Ser. No. 753,550 filed 7/10/85, which in turn was a Divisional of application Ser. No. 621,236 filed 6/15/84. Ser. No. 892,831 is abandoned. Ser. No. 753,550 is U.S. Pat. No. 4,724,085. Ser. No. 621,236 is U.S. Pat. No. 4,576,714.

BACKGROUND OF THE INVENTION

1. Field of the Invention

The present invention relates to a method for treating impure water, and more particularly to an improved method for treating sewage to produce treated effluent of very high quality.

2. Description of the Background Art

It is known that color, turbidity, organic matter and similar impurities may be removed from water by coagulants, e.g. alum, ferric sulfate or the like. These compounds are acidic and react with the alkalinity in the water or with alkaline compounds, e.g. lime or soda ash, to form voluminous insoluble precipitates (hydrates). The precipitates have a tremendous surface area on which the dissolved or colloidally dispersed impurities are absorbed. The suspended impurities are surrounded by the gelatinous hydrates and become part of the precipitate.

Domestic or sanitary sewage and industrial wastes may be purified by the chemical precipitation process, in which suitable chemicals (e.g. aluminum sulfate, lime, iron chloride, polyelectrolytes or combinations thereof) are added to the sewage and the sewage passed to one or more flocculating tanks, normally equipped with slowly rotating agitators or paddles, in which colloidal solids are formed into particles of size and weight that will settle. The colloidal solids or flocs are then separated from the liquid by being allowed to settle in subsequent settling tanks, whereafter the purified water is collected in a weir structure mounted at the surface of the water, while the sediment, consisting of flocs and sludge, is removed, normally by means of sludge scrapers and/or pumps.

The prior art teaches the addition of various types of chemicals and combinations of chemicals to sewage and other impure water to remove various pollutants therefrom.

There are several deficiencies in all of the prior art which the present invention overcomes as indicated below:

1. The invention, when used to treat raw sewage or other impure water with very economical doses of three chemicals converts a very high proportion of the suspended, colloidal and dissolved pollutants in the sewage or other impure water to large, dense and stable flocs which are so resistant to shear forces they can be settled out in a clarifier without the aid of inclined sedimentation means, and with an upward flow velocity of at least eighteen to twenty meters per hour. This flow rate is approximately ten times higher than recommended by those skilled in the art for clarifiers without inclined sedimentation means. (Ref. p. 149 - Nutrient Control—Manual of Practice FD-7-Facilities Design by the Water Pollution Control Federation 1983.

The foregoing is a very important advantage from an economic point of view because it allows the use of a very much smaller clarifier, and reduces the area of land required for a treatment plant.

2. The invention, notwithstanding the fact that very economical doses of chemicals are used and the floc is settled against an upward velocity flowrate of 18-20 m/hr. without inclined sedimentation means, achieves removal rates of pollutants which heretofore have not been possible as indicated hereunder:

| Pollutant | Average % Removal |
| --- | --- |
| Biochemical Oxygen Demand ($BOD_5$) | 76% |
| Dissolved $BOD_5$ under 0.2 microns in size | 32% |
| $BOD_5$ over 0.2 microns in size | 95% |
| Total phosphorus | 97% |
| Turbidity | 95% |
| Total Suspended Solids | 92% |
| Fats, Oils and Grease | 90% |
| Aluminum | Removes all of the the aluminum which is dosed into the sewage or industrial effluent, in addition to approximately 70% of the small quantity of aluminum present in the influent. |

3. The invention is a considerable improvement over the prior art in relation to the removal of Biochemical Oxygen Demand ($BOD_5$), with approximately 95% of all $BOD_5$ over 0.2 microns in size being removed, and in addition, almost one third of the $BOD_5$ less than 0.2 microns in size also being removed.

The implications of this fact means that the invention can be used in many locations to treat raw sewage to a standard that does not require further treatment before discharge to waterways, whereas the effluent from other chemical systems requires additional biological treatment.

Furthermore, where highly polluting waste waters are treated in accordance with this invention and where the resulting treated effluent requires additional biological treatment, the pollutional load on the subsequent biological system is reduced to a significant extent, thereby resulting in substantial cost savings.

4. When sewage or other impure water is treated using the methods described in this invention, the percentage removal of suspended solids and turbidity is significantly greater than can be accomplished by the prior art taking into account the dosage of chemicals and the flow rates through the clarifier.

This is a very important improvement over the prior art, and eliminates the need for a subsequent filtration process in many instances.

It also allows the use of additional processes in many cases such as Ultraviolet Disinfection, Reverse Osmosis, Activated Carbon and/or Ammonia Removal using Clinoptilolite Ion Exchange Material without the use of an intervening filtration process.

Tests have indicated that raw sewage, after being treated using the methods described by this invention, and then passed directly through an ultraviolet disinfection apparatus, was efficiently disinfected and the resultant total coliform count was only 10 per 100 ml.

5. A very important advantage of this invention over the prior art is its versatility. The invention can be used as either a Primary and/or Secondary and/or Tertiary Treatment system, and can be combined to advantage with other chemical, physical or biological processes.

6. Another important advantage of this invention is the overall speed with which the treatment process takes place. While the overall retention time required is site specific and depends on such factors as the quality of the influent and/or the quality of the effluent required, typically, for sewage treatment the overall retention time is less than thirty minutes.

The system therefore easily lends itself to automation, which would have substantial economic advantages such as control of chemical dosages and reduction of labor costs.

7. The quality of the sludge produced by the use of this invention, while being site specific, is generally of a very high solids content and is readily thickened in a short period of time. The resulting thickened sludge is then readily dewatered to a high solids content cake. This is a very important aspect of this invention, and distinguishes this invention over the prior art in that the total volume of sludge to be disposed of is lower then usual, resulting in important economic and environmental advantages.

SUMMARY AND OBJECTS OF THE INVENTION

An object of the invention is to provide an improved process for treating sewage or other impure water which is simple and effective in providing a high quality treated effluent.

A further object of the present invention is to provide a sewage purification method wherein an inorganic coagulant, such as alum or ferric chloride, a cationic polymer, and an anionic polymer are added to sewage or other impure water in a sequential manner so as to produce a high quality treated effluent.

These and other objects of the invention are accomplished by a method for treating sewage or other impure water wherein the following three individual chemicals but no more than two premixed together are added to the sewage or other impure water in a mixing zone:

(a) an inorganic coagulant, (b) an anionic polymer, and (c) a cationic polymer with intimate mixing of the added chemicals with the sewage or other impure water, with the proviso that (d) the inorganic coagulant either alone or with the anionic polymer or the cationic polymer cannot be added last; and (e) the anionic polymer and the cationic polymer cannot be intimately mixed and added together, thereby to provide chemically-treated effluent having large, compact, firmly-bonded, substantially shear resistant and rapidly separable flocs therein; separating the flocs from the liquid in a separating zone; and removing treated liquid effluent from the separating zone.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DETAILED DESCRIPTION OF THE PREFERRED EMBODIMENTS

Predetermined amounts of three chemicals, one from each of the three broad generic groups namely, *Inorganic Coagulants* (i.e. aluminum sulphate, ferric chloride, *Cationic Polymers, e.g. Polyelectrolytes,* and *Anionic Polymers, e.g. Polyelectrolytes* are added to sewage or other impure water. The three chemicals are intimately mixed with the sewage or other impure water in a mixing/flocculation zone to form large dense flocs from the suspended, colloidal and dissolved pollutants in the sewage or other impure water, separating these flocs from the sewage or impure water in a separating zone, drawing of treated effluent from the separating zone, and recycling a predetermined amount of sludge from the separating zone to the mixing/flocculation zone. The dosages of chemicals, the sequence of addition, the specific chemicals used and the amount and location of sludge recycle are site specific and depend on design parameters such as:

1. The quality of the influent impure water to be treated;
2. The quality of effluent required or economic, and/or environmental and/or health criteria.

Extensive testing has been carried out using this process on raw sewage and on industrial type effluent, and it has been discovered that there are certain combinations in which the three chemicals at economic dosage levels can give improved and unexpected results over the prior art, while other combinations using the same dosage levels give most unsatisfactory results under the same test conditions.

The following sequence of additions of the chemicals to the sewage or impure water are the ones to be employed to give the desired results:

(1) All three chemicals added separately in the following sequence:
  (a) Inorganic Coagulant
  (b) Anionic Polymer
  (c) Cationic Polymer (2) All three chemicals added separately in the following sequence:
  (a) Cationic Polymer
  (b) Inorganic Coagulant
  (c) Anionic Polymer (3) All three chemicals added separately in the following sequence:
  (a) Anionic Polymer
  (b) Inorganic Coagulant
  (c) Cationic Polymer (4) An inorganic coagulant and a cationic polymer are mixed in the one container and then dosed into the sewage as one homogeneous mixture, intimately mixed with the sewage, and then anionic polymer is dosed into the sewage.

(5) An inorganic coagulant and an anionic polymer are mixed in the one container and then dosed into the sewage as one homogeneous mixture, intimately mixed with the sewage, and then cationic polymer is dosed into the sewage.

For the combinations 1, 2 and 3 above, where each of the three chemicals are added separately, the following general procedure is adopted.

A. A predetermined amount of the first chemical is dosed into the sewage or other impure water through one or more injection points at a first part of the mixing/flocculation zone and is intimately mixed with the said sewage or other impure water, then:

B. A predetermined amount of the second chemical is dosed into the sewage or other impure water through one or more injection points at a second part of the mixing/flocculation zone and is intimately mixed with the said sewage or other impure water, and then:

C. A predetermined amount of the third chemical is dosed into the sewage or other impure water through one or more injection points at a third part of the mixing/flocculation zone and is intimately mixed with the sewage or other impure water.

D. A predetermined amount of the sludge removed from the solids separating zone is recycled to the mixing/flocculation zone, and is dosed into and intimately mixed with the sewage or other impure water. The location of the sludge recycle point in the mixing/flocculation zone and the quantity recycled is site specific and depends on the design parameters as previously described herein.

E. The time interval between the addition of the first chemical and the second chemical or between the second chemical and the third chemical in the mixing/flocculation zone is site specific and depends on the design parameters as previously described herein.

F. The time interval between the addition of the recycled sludge and either the preceding or subsequent chemical in the mixing/flocculation zone is site specific and depends on the design parameters as previously described herein.

G. The degree of mixing required in the mixing/flocculation zone is site specific and depends on the design parameters as previously described herein.

H. The total retention time in the mixing/flocculation zone and the separating zone is site specific, and depends on the design parameters as previously described herein.

For the combinations 4 and 5 above, where an inorganic coagulant is mixed in one container with one of the polymers and then dosed into the sewage or impure water as one homogeneous mixture and then the other polymer is dosed into the sewage, the following general procedure is adopted:

A. A predetermined amount of the inorganic coagulant and one of the polymers is mixed in one container and dosed as one homogeneous mixture into the sewage or other impure water through one or more injection points at a first part of the mixing/flocculation zone and is intimately mixed with the sewage or other impure water, and then B. A predetermined amount of the other polymer (i.e. of opposite charge to the polymer in Step A above) is dosed into the sewage or other impure water through one or more injection points of a second part of the mixing/flocculation zone and it is intimately mixed with the said sewage or other impure water.

C. A predetermined amount of the sludge removed from the separating zone is recycled to the mixing/flocculation zone and is dosed into and intimately mixed with the sewage or other impure water. The location of the sludge recycle point in the mixing/flocculation zone and the quantity recycled is site specific and depends on the design parameters as previously described herein.

D. The time interval between the addition of the homogeneous mixture of the first two chemicals (i.e. an inorganic coagulant and a polymer) and the third chemical i.e. the polymer of opposite charge to that mixed with the inorganic coagulant, in the mixing/flocculation zone is site specific and depends on the design parameters as previously described herein.

E. The time interval between the addition of the recycled sludge and either the preceding or subsequent chemical dosage in the mixing/flocculation zone is site specific and depends on the design parameters as previously described herein.

F. The degree of mixing required in the mixing/flocculation zone is site specific and depends on the design parameters as previously described herein.

G. The total retention time in the mixing/flocculation zone and the separating zone is site specific and depends on the design parameters as previously described herein.

The process is suitable for treating sewage or other impure water without any further form of treatment, but in some instances, depending on the quality of the influent or the quality of the effluent required, it may be necessary to adjust the pH or the alkalinity of the influent or the effluent by the use of methods well known in the art.

Many types of inorganic coagulants can be used in the application of this invention, for example, aluminum sulphate (alum) and ferric chloride. The specific type of inorganic coagulant to be used is site specific and depends on the design parameters.

Many types of cationic polymers may be used, and the following have been used with success: HERCOFLOC 855, HERCOFLOC 876, HERCOFLOC 849, all supplied by Hercules Inc., and PERCOL 763 supplied by Allied Colloids Inc.

Many types of anionic polyelectrolytes may be used, and the following have been used with success: PERCOL 1011 supplied by Allied Colloids Inc., and HERCOFLOC 831 and HERCOFLOC 847 supplied by Hercules Inc.

One method for the treatment of sewage or other impure water is disclosed wherein three chemicals are added to the sewage in the following specific sequence to produce treated effluent. An inorganic coagulant, such as alum or ferric chloride and preferably in the amount of about 10–300 ppm by weight to sewage is added and is intimately mixed therewith to provide pretreated sewage; then about 0.1–5 ppm by weight of an anionic polymer is added to the pretreated sewage and is intimately mixed therewith to provide an interim pretreated sewage; then about 0.1–5 ppm by weight of a cationic polymer is added to the interim pretreated sewage and is intimately mixed therewith to provide chemically-treated sewage. The chemically-treated sewage is supplied to a separating zone wherein the chemically-treated effluent and sludge are separately removed. A predetermined amount of sludge is recycled back to the mixing/flocculation zone.

In another method, according to the present invention, the anionic polymer in an amount of about 0.1–5 ppm by weight is added to and intimately mixed in the sewage to provide pretreated sewage; then an inorganic coagulant, such as alum in the amount of about 10-300 ppm by weight is added to and intimately mixed with the pretreated sewage to provide an interim pretreated sewage; then about 0.1-5 ppm parts by weight of cationic polymer is added to and intimately mixed with the interim pretreated sewage to provide chemically treated effluent.

The chemically treated effluent is supplied to a separating zone wherein the chemically treated effluent and sludge are separately removed. A predetermined amount of sludge is recycled back to the mixing/flocculation zone.

In another method according to the present invention, about 0.1-5 ppm parts by weight of high cationic polymer is added to and intimately mixed with the sewage to provide pretreated sewage, then an inorganic coagulant, such as alum in the amount of about 10-300 ppm by weight is added to and intimately mixed with the pretreated sewage to provide an interim pretreated sewage; then about 0.1-5 ppm by weight of anionic polymer is added to and intimately mixed with the interim pretreated sewage to provide chemically treated sewage. Then the chemically-treated sewage is supplied to a separating zone wherein chemically-treated effluent and sludge are separately removed. A predetermined amount of sludge is recycled back to the mixing/flocculation zone.

In another method according to the present invention, the inorganic coagulant (e.g. alum or ferric chloride) is mixed in the one container with the cationic polymer to form a homogeneous mixture which is then added so as to give a dosage of about 10-300 ppm by weight of inorganic coagulant and a dosage of about 0.1-5 ppm by weight of cationic polymer and intimately mixed with the sewage to provide an interim pretreated sewage; then at a later time about 0.1 to 5 ppm by weight of an anionic polymer is added and intimately mixed with the interim pretreated sewage to provide chemically-treated sewage. The chemically-treated sewage is supplied to a separating zone wherein the chemically treated effluent and sludge are separately removed. A predetermined amount of sludge is recycled back to the mixing/flocculation zone.

In another method according to the present invention, the inorganic coagulant (e.g. alum or ferric chloride) is mixed in the one container with the anionic polymer to form a homogeneous mixture which is then added so as to give a dosage of about 10-300 ppm by weight of inorganic coagulant and a dosage of about 0.1-5 ppm by weight of anionic polymer and intimately mixed with the sewage to provide an interim pretreated sewage; then at a later time about 0.1 to 5 ppm by weight of an cationic polymer is added and intimately mixed with the interim pretreated sewage to provide chemically treated sewage. The chemically treated sewage is supplied to, a separating zone wherein the chemically treated effluent and sludge are separately removed. A predetermined amount of sludge is recycled back to the mixing/flocculation zone.

Although the above examples refer to the range of 0.1-5 ppm parts by weight of the anionic polymer and the cationic polymer, it is to be understood that the range of 0.1-10 ppm may be used depending on the type of sewage or impure water being treated. In addition, the amount of predetermined sludge recycled back in the process is typically on the order of 1 to 10%. This percentage may vary depending on the quality of the influent and the desired effluent quality.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

I claim:

1. A method for the treatment of sewage or other impure water which comprises:
   (1) adding and with intimate mixing to said sewage or other impure water in a mixing zone components:
      (a) an inorganic coagulant which comprises an aluminum salt or an iron salt in an amount of from about 10 to 300 ppm parts by weight,
      (b) an anionic acrylamide polymer polyectrolyte in an amount of from about 0.1-10 ppm parts by weight, and
      (c) a cationic amine or acrylamide polymer polyelectrolyte in an amount of from about 0.1-10 ppm parts by weights,
   wherein all three components are individually mixed but no more than two of said components are premixed together;
   with the proviso that
   said inorganic coagulant either alone or with the anionic polyelectrolyte or the cationic polyelectrolyte cannot be added last; and
   said anionic polyelectrolyte and said cationic polyelectrolyte cannot be intimately mixed and added together,
   thereby to provide a chemically-treated liquid effluent having large, compact, firmly-bonded, substantially-shear resistant and rapidly-separable flocs therein;
   (2) separating the flocs from the chemically-treated liquid effluent in a separating zone; and
   (3) removing said chemically-treated liquid effluent from the separating zone.

2. The method of claim 1, wherein said flocs are separated from said chemically treated liquid effluent by settling as a sludge.

3. The method of claim 2, wherein said sludge is recycled to said mixing zone.

4. The method of claim 1, which is characterized by the following sequential steps: first adding the anionic polyelectrolyte of component (b), then adding the inorganic coagulant of component (a) and finally adding the cationic polyelectrolyte of component (c).

5. The method of claim 4, wherein said inorganic coagulant of component (2) is alum or ferric chloride.

6. The method of claim 5, wherein said anionic acrylamide polymer polyelectrolyte of component (b) is a polyacrylamide with negative acrylate groups and said cationic amine or acrylamide polymer polyelectrolyte of component (c) is a polyamine or a polyacrylamide.

7. The method of claim 4, wherein said anionic acrylamide polymer polyelectrolyte of component (b) is a polyacrylamide with negative acrylate groups.

8. The method of claim 4, wherein said cationic amine or acrylamide polymer polyelectrolyte of component (c) is a polyamine or a polyacrylamide.

9. The method of claim 1, which is characterized by the following sequential steps: first adding the cationic polyelectrolyte of component (c), then adding the inorganic coagulant of component (a), and finally adding the anionic polyelectrolyte of component (b).

10. The method of claim 9, wherein said inorganic coagulant of component a is alum or ferric chloride.

11. The method of claim 10, wherein said anionic acrylamide polymer polyelectrolyte of component (b) is a polyacrylamide with negative acrylate groups and said cationic amine or acrylamide polymer polyelectrolyte of component (c) is a polyamine or a polyacrylamide.

12. The method of claim 9, wherein said anionic acrylamide polymer polyelectrolyte of component (b) is a polyacrylamide with negative acrylate groups.

13. The method of claim 9, wherein said cationic amine or acrylamide polymer polyelectrolyte of component (c) is a polyamine or a polyacrylamide.

14. The method of claim 1, characterized by the following sequence of steps: first adding the inorganic coagulant of component (a), then adding the anionic polyelectrolyte of component (b) and finally adding the cationic polyelectrolyte of component (c).

15. The method of claim 14, wherein said inorganic coagulant of component a is alum or ferric chloride.

16. The method of claim 15, wherein said anionic acrylamide polymer polyelectrolyte of component (b) is a polyacrylamide with negative acrylate groups and said cationic amine or acrylamide polymer polyelectrolyte of component (c) is a polyamine or a polyacrylamide.

17. The method of claim 14, wherein said anionic acrylamide polymer polyelectrolyte of component (b) is a polyacrylamide with negative acrylate groups.

18. The method of claim 14, wherein said cationic amine or acrylamide polymer polyelectrolyte of component (c) is a polyamine or a polyacrylamide.

19. The method of claim 1, characterized by the following sequence of steps: first adding a homogeneous mixture of the inorganic coagulant of component (a) and the cationic polyelectrolyte of component (c), and finally adding the anionic polyelectrolyte of component (b).

20. The method of claim 19, wherein said inorganic coagulant of component a is alum or ferric chloride.

21. The method of claim 20, wherein said anionic acrylamide polymer polyelectrolyte of component (b) is a polyacrylamide with negative acrylate groups and said cationic amine or acrylamide polymer polyelectrolyte of component (c) is a polyamine or a polyacrylamide.

22. The method of claim 19, wherein said anionic acrylamide polymer polyelectrolyte of component (b) is a polyacrylamide with negative acrylate groups.

23. The method of claim 19, wherein said cationic amine or acrylamide polymer polyelectrolyte of component (c) is a polyamine or a polyacrylamide.

24. The method of claim 1, characterized by the following sequence of steps: first adding a homogeneous mixture of the inorganic coagulant of component (a) and the anionic polyelectrolyte of component (b), and finally adding the cationic polyelectrolyte of component (c).

25. The method of claim 24, wherein said inorganic coagulant of component a is alum or ferric chloride.

26. The method of claim 25, wherein said anionic acrylamide polymer polyelectrolyte of component (b) is a polyacrylamide with negative acrylate groups and said cationic amine or acrylamide polymer polyelectrolyte of component (c) is a polyamine or a polyacrylamide.

27. The method of claim 24, wherein said anionic acrylamide polymer polyelectrolyte of component (b) is a polyacrylamide with negative acrylate groups.

28. The method of claim 24, wherein said cationic amine or acrylamide polymer polyelectrolyte of component (c) is a polymer or a polyacrylamide.

29. The method of claim 1, wherein said inorganic coagulant of component (a) is alum or ferric chloride.

30. The method of claim 1, wherein said anionic acrylamide polymer polyelectrolyte of component (b) is a polyacrylamide with negative acrylate groups.

31. The method of claim 1, wherein said cationic amine or acrylamide polymer polyelectrolyte of component (c) is a polyamine or a polyacrylamide.

* * * * *